J. S. THOMPSON.
BRAKE SHOE.
APPLICATION FILED DEC. 17, 1919.
1,369,497.
Patented Feb. 22, 1921.
4 SHEETS—SHEET 1.
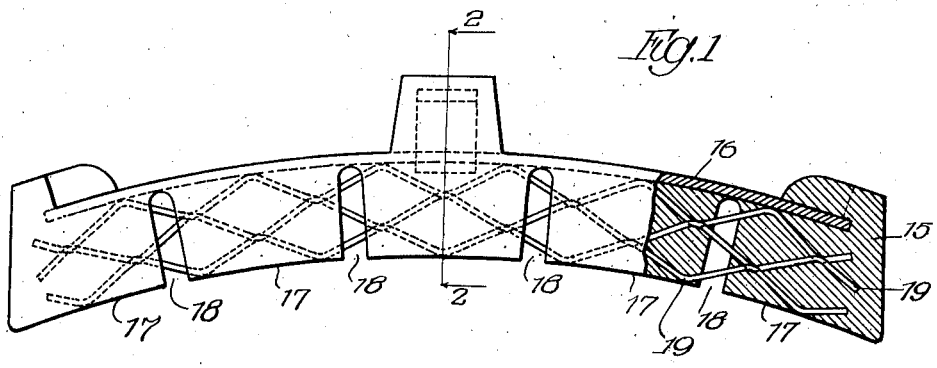
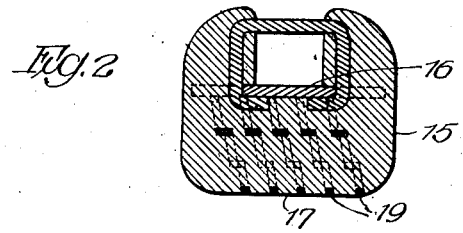
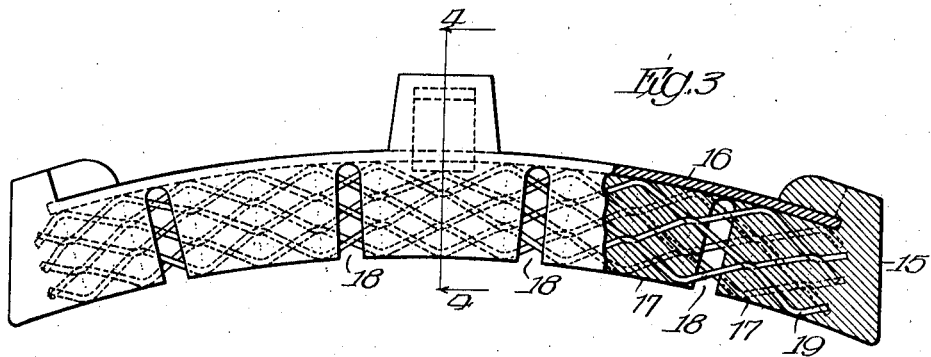
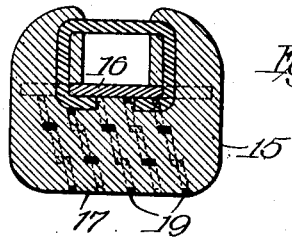

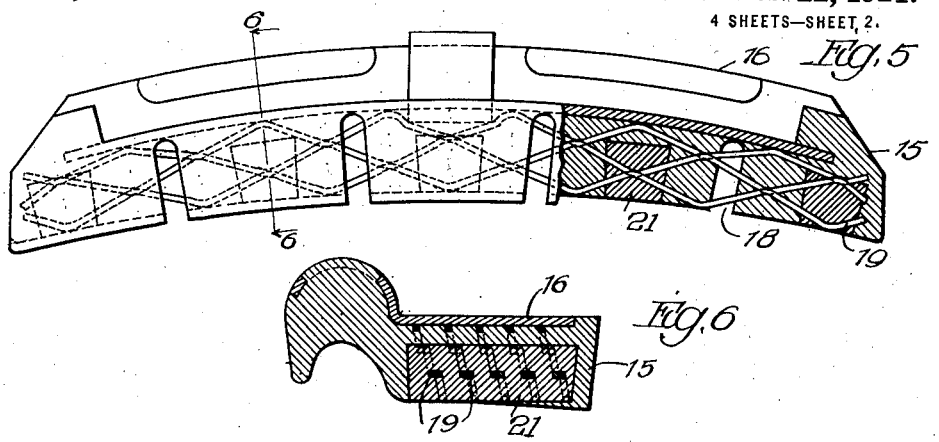
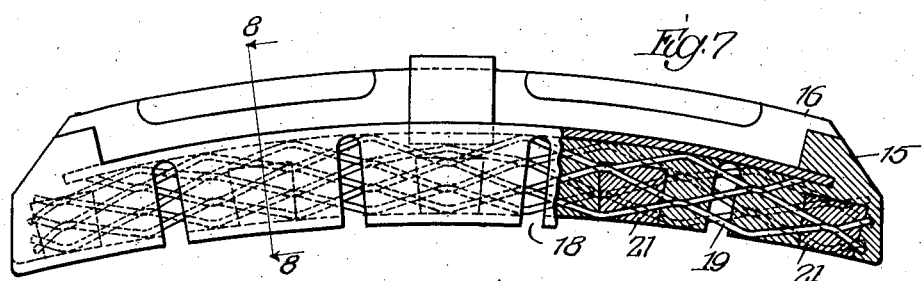
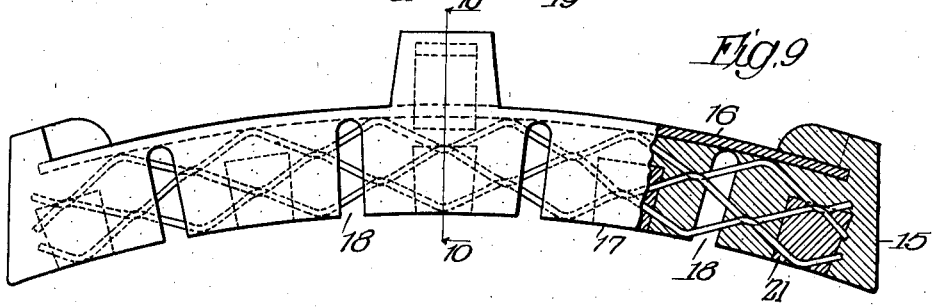
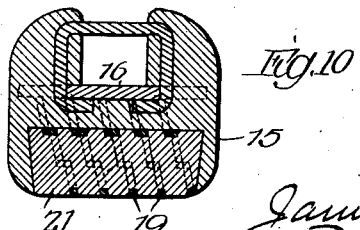

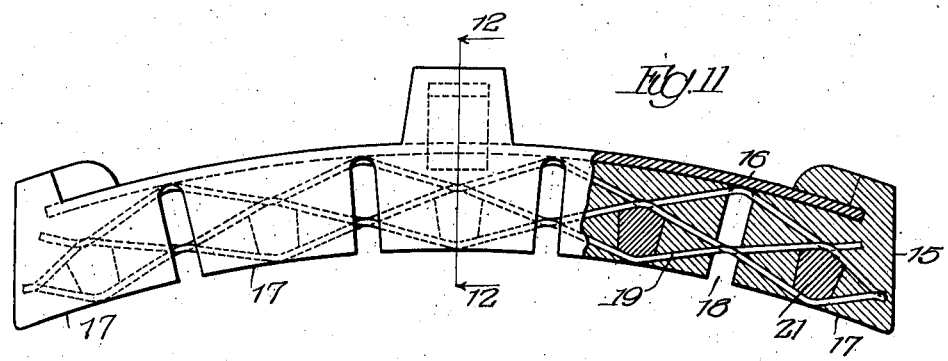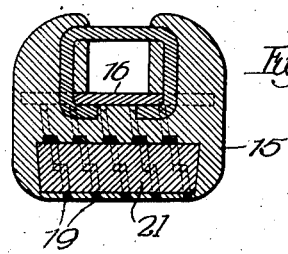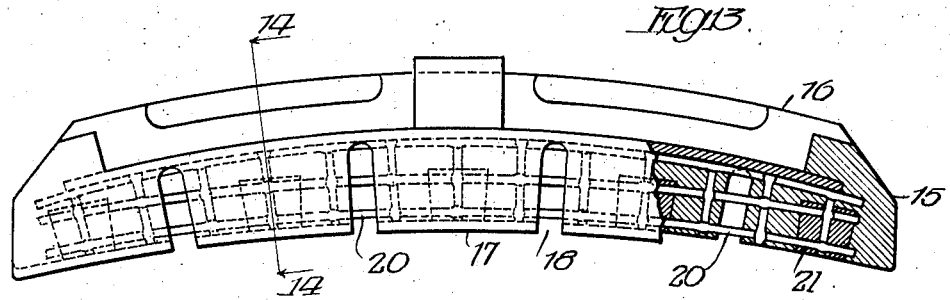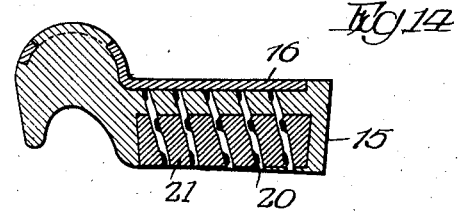

J. S. THOMPSON.
BRAKE SHOE.
APPLICATION FILED DEC. 17, 1919.

1,369,497.

Patented Feb. 22, 1921.
4 SHEETS—SHEET 4.

Inventor
James S. Thompson
By Wm. J. Bell
Atty

UNITED STATES PATENT OFFICE.

JAMES S. THOMPSON, OF PELHAM, NEW YORK, ASSIGNOR TO THE AMERICAN BRAKE SHOE & FOUNDRY COMPANY, OF WILMINGTON, DELAWARE, A CORPORATION OF DELAWARE.

BRAKE-SHOE.

1,369,497.      Specification of Letters Patent.      Patented Feb. 22, 1921.

Application filed December 17, 1919. Serial No. 345,534.

*To all whom it may concern:*

Be it known that I, JAMES S. THOMPSON, a citizen of the United States, residing at Pelham, in the county of Westchester and State of New York, have invented certain new and useful Improvements in Brake-Shoes, of which the following is a specification.

This invention relates to the segmental type of brake shoe set forth in Letters Patent No. 1,122,583, dated December 29th, 1914, and it has for its object to reinforce and strengthen the shoe against fracture in handling and in service.

And further objects of the invention are to distribute the reinforcing and strengthening means throughout the body of the shoe so that the entire body will be reinforced and strengthened against fracture during the entire life of the shoe, and so that the reinforcing and strengthening means will constantly change in position and area on the wearing face of the shoe during service to avoid cutting or scoring the wheel.

Other objects will appear in the detail description of the invention with reference to the accompanying drawings which illustrate selected embodiments of the invention, and referring to which—

Figure 1 is a side elevation, partly in section, illustrating the invention in a simple form of car shoe.

Fig. 2 is a cross sectional view on the line 2—2 of Fig. 1.

Fig. 3 is a view similar to Fig. 1 showing the reinforcing strips in staggered relation to each other.

Fig. 4 is a cross sectional view on the line 4—4 of Fig. 3.

Fig. 5 illustrates a flange shoe with inserts embedded in the body thereof.

Fig. 6 is a sectional view on the line 6—6 of Fig. 5.

Fig. 7 is a view similar to Fig. 5 with the reinforcing strips in staggered relation.

Fig. 8 is a cross sectional view on the line 8—8 of Fig. 7.

Fig. 9 is a view similar to Fig. 1, having inserts embedded in the body of the shoe.

Fig. 10 is a cross sectional view on the line 10—10 of Fig. 9.

Fig. 11 is a view similar to Fig. 1 with inserts arranged in the registered openings of the reinforcing strips.

Fig. 12 is a cross sectional view on the line 12—12 of Fig. 11.

Fig. 13 is a view similar to Fig. 5, showing the reinforcing strips made of wire mesh.

Fig. 14 is a cross sectional view on the line 14—14 of Fig. 13.

Figure 15:
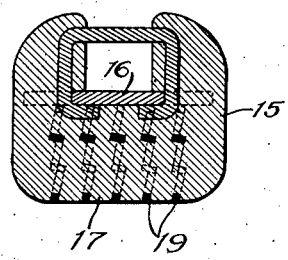
Figs. 15 to 21 are cross-sectional views corresponding to the other cross-sectional views but showing the strips in upright or perpendicular position to the wearing face of the shoe.
Figure 16:
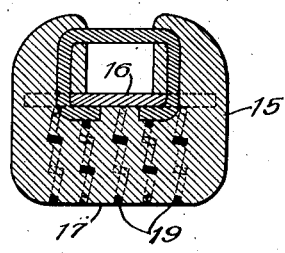
Figure 17:
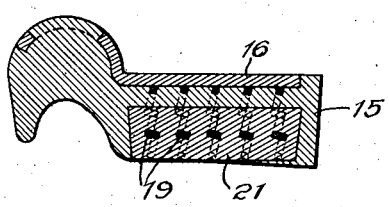
Figure 18:
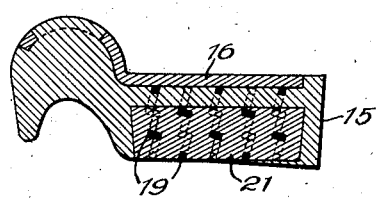
Figure 19:
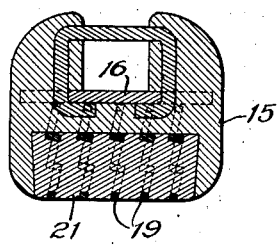
Figure 20:
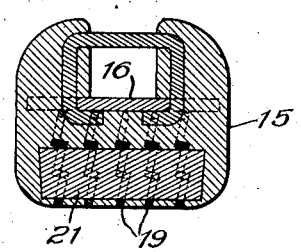

Referring to the drawings 15 is the body of the shoe and 16 is a reinforcing back on which the body is cast. I have shown several kinds of shoes and two different kinds of backs in the drawings and it will be understood that my present invention may be embodied in all varieties of shoes and with any kind of backs for which it is or may be adapted.

As more particularly set forth in Patent 1,122,583, the body portion of the shoe is divided into a plurality of segments 17 by transverse slots or grooves 18 which extend from the wearing face of the shoe to, or approximately to, the reinforcing back 16. These slots or grooves are formed in the casting operation and the body is anchored to the back in accordance with the practices commonly followed in the manufacture of brake shoes.

Owing to the great strains and blows to which brake shoes are subject in handling and in service, there would always be more or less danger of the body of the shoe fracturing at the base of the slots or grooves if no means other than the back were provided for reinforcing and strengthening the body, and in case of fracture segments of the shoe might drop off and thus impair the serviceability of the shoe. Furthermore, a detached segment might lodge in a frog or switch and cause derailment of a train. These segmental shoes have great efficiency and constitute a very important advance in the art. My invention is designed to overcome the danger of segmental shoes fracturing in handling and in service, and thereby to make them generally valuable for commercial use without impairing their known efficiency.

Figure 21:
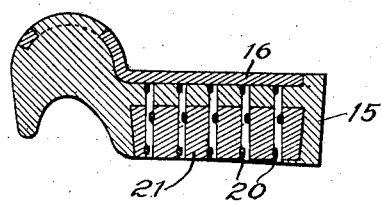

I accomplish this by embedding in the body of the shoe a plurality of reinforcing and strengthening strips of reticulated metal. These strips may be made of expanded metal 19, as shown in Figs. 1 to 12 and 15 to 20 inclusive, or they may be made of wire mesh 20, as shown in Figs. 13, 14 and 21, or they may be made of any other kind of reticulated metal suitable for the purpose. If necessary or desirable the strips may be spot-welded or otherwise anchored or secured to the back 16. The strips may be arranged with their openings in registration as shown in Figs. 1, 5, 9, 11 and 13, or the strips may be arranged in staggered relation as shown in Figs. 3 and 7; and the strips may be inclined or tilted on edge to the wearing face of the shoe as shown in Figs. 2, 4, 6, 8, 10, 12 and 14, or they may be upright or perpendicular to the wearing face of the shoe as shown in Figs. 15 to 21.

My invention preserves all of the valuable features of a segmental shoe and in addition it overcomes the structural weakness of a segmental shoe due to the division of its body into a plurality of segments by transverse slots or grooves which naturally have a tendency to weaken the body. The reinforcing and strengthening strips are firmly embedded in and anchored to the segments and they extend through the grooves and connect the segments to form a sufficiently strong, rigid and substantial unitary structure which will withstand the rough usage of handling and the strains and blows to which brake shoes are subject in service. I do not mean that the strips will necessarily hold the body of the shoe constantly in a state of absolute rigidity because the intense frictional heat often generated in the application of the brakes may have a tendency to straighten out or warp or twist or distort the body of the shoe to some extent although experience has shown that this tendency is very materially if not entirely eliminated by the segmental shoe. However, any such tendency that may exist in a segmental shoe is restrained by the reinforcing and strengthening strips which hold the segments together in proper relation but to a certain degree yieldingly which will avoid an objectionable rigidity. Nor do I mean such a rigidity as may result in fracture in the application of a new shoe to a wheel which it does not perfectly fit, as set forth in my Patent No. 861,556, dated July 30th, 1907. The reinforcing and strengthening strips will hold together the segments of the body in a unitary structure and in a sufficiently rigid manner to overcome any liability of the shoe fracturing in ordinary commercial use. Those portions of the reinforcing and strengthening strips, especially expanded metal strips, located in the slots or grooves between the segments will permit whatever yielding action may be required in a segmental shoe to avoid that absolute rigidity which might result in fracture under the varying conditions of service. It is my belief based upon actual test of segmental brake shoes embodying my invention, as well as upon my long experience in the brake shoe art, that these reinforcing strips will entirely prevent the segmental shoe in which they are embedded from fracturing or cracking, and that they will overcome the inherent weakness of the segmental shoe without in any way lessening its efficiency. I am sure that if by chance such a shoe is fractured or cracked in handling or in service the strips will hold the parts together so that the shoe may be continued in service with full efficiency and without the danger which would accompany the detachment of parts from the shoe.

Insert sections or blocks may be cast on the strips as shown in Figs. 5 to 10 inclusive, and Figs. 13, 14, 17, 18, 19 and 21, or they may be inserted in registered openings of the strips as shown in Figs. 11, 12 and 21, and embedded with the strips in the body of the shoe. These insert sections or blocks may be made in any form and of any material suitable for the purpose. The insert sections or blocks may be cast on the strips when arranged in inclined or in upright position and with substantially equal facility, but I have found it easier to arrange the lose sections or blocks in the strips when they are supported in an inclined position. Attention may also be directed to the fact that the position of the parts of the strips exposed on the wearing face of the shoe will vary as the shoe wears down more where the strips are inclined or tilted than when they are upright or perpendicular.

I have not attempted to show all of the different embodiments of the invention which may be satisfactorily employed, but those which I have shown will indicate how the invention may be adapted to different types of shoes, and I reserve the right to make all such changes in the form, arrangement and proportion of parts as fairly fall within the scope of the following claims.

I claim:

1. A brake shoe having its body divided into segments by a plurality of transverse grooves, and a reinforcing strip of reticulated metal embedded in the body on edge to the wearing face of the shoe and extending through said grooves.

2. A brake shoe having its body divided into a plurality of segments by transverse grooves, and a plurality of reinforcing strips of reticulated metal embedded in the body on edge to the wearing face of the shoe and extending through said grooves.

3. A brake shoe having its body divided into a plurality of segments by transverse grooves and a plurality of expanded metal strips embedded in the body on edge to the wearing face of the shoe and extending through said grooves.

4. A brake shoe having its body divided into a plurality of segments by transverse grooves, and a plurality of reinforcing strips of reticulated metal embedded in the body in an inclined position on edge to the wearing face of the shoe and extending through said grooves.

5. A brake shoe having its body divided into a plurality of segments by transverse grooves, and a plurality of expanded metal reinforcing strips embedded in the body in an inclined position on edge to the wearing face of the shoe and extending through said grooves.

6. A brake shoe having its body divided into a plurality of segments by transverse grooves, a plurality of reinforcing strips of reticulated metal embedded in the body on edge to the wearing face of the shoe and extending through said grooves, and insert sections or blocks engaged with said strips and embedded in the segments.

7. A brake shoe having its body divided into a plurality of segments by transverse grooves, a plurality of reinforcing strips of reticulated metal embedded in the body in an inclined position on edge to the wearing face of the shoe and extending through said grooves, and insert sections or blocks engaged with said strips and embedded in the segments.

8. A brake shoe having its body divided into a plurality of segments by transverse grooves, a plurality of reinforcing strips of reticulated metal embedded in the body on edge to the wearing face of the shoe and extending through said grooves, and insert sections or blocks cast on said strips and embedded with the strips in the segments.

9. A brake shoe having its body divided into a plurality of segments by transverse grooves, a reinforcing back anchored to the body, and a plurality of reinforcing strips of reticulated metal secured to the back and embedded in the body in an inclined position on edge to the wearing face of the shoe and extending through said grooves.

JAMES S. THOMPSON.

Witness:
M. A. KIDDIE.